July 28, 1959
HIDEO AZUMA
2,896,506
HIGH APERTURE WIDE-ANGLE OBJECTIVE LENS
Filed June 5, 1956
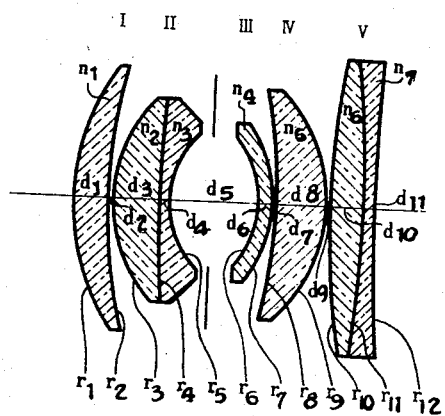
INVENTOR.
HIDEO AZUMA
BY
ATTORNEY

United States Patent Office

2,896,506
HIGH APERTURE WIDE-ANGLE OBJECTIVE LENS

Hideo Azuma, Meguroku, Tokyo, Japan, assignor to Nippon Kogaku K.K., Tokyo, Japan, a corporation of Japan Application June 5, 1956, Serial No. 589,554

3 Claims. (Cl. 88—57)

This invention relates to a photographic objective and more particularly a high aperture wide-angle objective.

An object of this invention is to obtain remarkably high intensity wide-angle optical objectives which considerably minimize astigmatism, curvature of field, chromatic and spherical aberration, coma and distortion.

In wide-angle photographic objectives having an angle of field more than 60°, it has hitherto been difficult to obtain wide-angle lenses of relative apertures larger than F:2.5 and angles of field more than 60°, in that when the relative aperture is made larger so as to have distinct vision, the coma of oblique light rays from locations away from the optical axis considerably increases, rendering it eventually difficult to correct astigmatism, curvature of field and coma simultaneously.

The instant invention provides a photographic objective having five air-spaced components, of which the first and fourth components are meniscus, single collective lenses, the first component having its surfaces convex towards the object side of the objective while the fourth component has its surfaces convex to the image side; the second component is a meniscus dispersive component consisting of a positive lens cemented to a negative lens with its surface towards the object side; the third component is a single dispersive lens with its convex surface towards the image side; and the fifth component is a collective component consisting of a positive lens cemented to a negative lens, the convex surface of the fifth component being towards the object side. With individual magnitudes of the components observing the hereinafter identified magnitudes, I have obtained the high aperture, wide angle, objective of the foregoing type which has exceedingly small values for the aberrations for improved performance.

A clearer conception of the scope and purpose of this invention may be obtained from the following description, taken in connection with the attached drawing in which the sole figure shows an illustrative embodiment of my invention, the components having increasing reference characters, I, II . . . V, in the direction from the object side to the image side. The radii of curvature $r$ of the successive optical surfaces, the axial distances $d$ of the individual lens thicknesses and between-the-lens spacings, and the refractive indices $n$ for the $d$-line of the materials of the individual lenses have increasing subscripts in the same direction to identify the particular magnitude precisely.

Coma of oblique rays, I have found, is corrected by comparatively enlarging the radii of curvature, $r_5$ and $r_6$, of the two dispersive lenses, II and III, between which the diaphragm is positioned and by making the radius $r_{10}$ of the front surface of the fifth component V divisionally bear the converging power of the rear surfaces, $r_7$ and $r_9$, of the third and fourth components, III and IV. Astigmatism and curvature of field is corrected by the effect of the relation of the axial thickness, $d_6$ and $d_8$, of the third and fourth components, III and IV.

The requirements, in accordance with my invention, I have found to be as follows, where $f$ is the equivalent focal length of the total objective lens array:

$0.30\ f > r_5 > 0.17\ f$,
$0.30\ f > |r_6| > 0.17\ f$,
$0.43\ f > |r_7| > 0.28\ f$,
$0.53\ f > |r_9| > 0.36\ f$,
$10\ f > r_{10} > 1.3\ f$,
$0.07\ f > d_6 > 0.03\ f$ and
$0.20\ f > d_8 > 0.10\ f$.

I have additionally found that the magnitude and degree of correction obtained in the instant objectives is increased by using materials for the positive lenses of the first, fourth and fifth components, I, IV and V, which have indices of refraction for the $d$-line, $n_1$, $n_5$ and $n_6$ which are larger than 1.65 but smaller than 1.80, or, mathematically expressed, $1.80 > n_1 > 1.65$,
$1.80 > n_5 > 1.65$ and
$1.80 > n_6 > 1.65$.

By way of a specific embodiment of the objective of my invention, the data on one illustrative embodiment is:

[$f=1$    F: 1.8    Field Angle=63°]

| Radii | Axial Thickness and Separation | Refractive Indices | Abbe Numbers |
|---|---|---|---|
| $r_1 = +0.6024$ | $d_1 = 0.1000$ | $n_1 = 1.7197$ | $v_1 = 50.2$ |
| $r_2 = +1.398$ | $d_2 = 0.0028$ | | |
| $r_3 = +0.3943$ | $d_3 = 0.1361$ | $n_2 = 1.6620$ | $-v_2 = 57.7$ |
| $r_4 = +4.792$ | $d_4 = 0.0250$ | $n_3 = 1.6206$ | $v_3 = 38.0$ |
| $r_5 = +0.2439$ | $d_5 = 0.2444$ | | |
| $r_6 = -0.2562$ | $d_6 = 0.0428$ | $n_4 = 1.7850$ | $v_4 = 25.9$ |
| $r_7 = -0.3443$ | $d_7 = 0.0028$ | | |
| $r_8 = -1.516$ | $d_8 = 0.1472$ | $n_5 = 1.7197$ | $v_5 = 50.2$ |
| $r_9 = -0.4267$ | $d_9 = 0.0028$ | | |
| $r_{10} = +1.944$ | $d_{10} = 0.0889$ | $n_6 = 1.6910$ | $v_6 = 54.1$ |
| $r_{11} = -2.903$ | $d_{11} = 0.0333$ | $n_7 = 1.7850$ | $v_7 = 25.9$ |
| $r_{12} = +5.855$ | | | |

Petzval's sum: 0.222.

I have noted that the adjacent surfaces of the positive and negative lenses of the second component II, need not be cemented together but that a narrow air space can be left between them. In such case, the radius of each such adjacent face being denoted by $r_4$ and $r'_4$ need not be absolutely identical but may differ slightly from each other and the air space between them denoted by $d_a$. Then without changing the subscripts for the lens thickness, separation and radii for the lens components immediately following the air space $d_2$ towards the image side, the above said requirements are fully satisfied.

What I claim is:

1. A high aperture, wide angle photographic objective comprising five components spaced from each other of which the first component I is a single meniscus collective lens with its convex surface toward the object side of the objective, the second component II is a meniscus dispersive component consisting of a positive lens cemented to a negative lens, the convex surface of the second component being towards the object side, the third component III is a single meniscus dispersive lens with its convex surface of radius $r_7$ towards the image side of the objective, the diaphragm being positioned between the surfaces of radii $r_5$ and $r_6$ of the second and third components respectively, the fourth component IV is a meniscus single collective lens with its convex surface of radius $r_9$ towards the image side, and the fifth component V is a collective component consisting of a positive lens cemented to a negative lens, the convex surface of radius $r_{10}$ of the fifth component being towards the object side, the radii $r_5$, $r_6$, $r_7$, $r_9$ and $r_{10}$, and the axial thicknesses $d_6$ and $d_8$ of the third and fourth components meeting the following requirements in terms of the equivalent focal length $f$ of the total objective array:

$$0.30\ f > r_5 > 0.17\ f,$$
$$0.30\ f > |r_6| > 0.17\ f,$$
$$0.43\ f > |r_7| > 0.28\ f,$$
$$0.53\ f > |r_9| > 0.36\ f$$
$$10\ f > r_{10} > 1.3\ f,$$
$$0.07\ f > d_6 > 0.03\ f,\ \text{and}$$
$$0.20\ f > d_8 > 0.10\ f,$$

and the refractive index of each the first and fourth component and of the positive lens of the fifth component lies between 1.65 and 1.80.

2. A high aperture, wide angle photographic objective comprising five components spaced from each other of which the first component I is a single meniscus collective lens with its convex surface toward the object side of the objective, the second component II is a meniscus dispersive component consisting of a positive lens spaced a slight distance $d_a$ from a negative lens, the adjacent surfaces having substantially the same radius of curvature, the convex surface of the second component being towards the object side, the third component III is a single meniscus dispersive lens with its convex surface of radius $r_7$ towards the image side of the objective, the diaphragm being positioned between the surfaces of radii $r_5$ and $r_6$ of the second and third components respectively, the fourth component IV is a meniscus single collective component with its convex surface of radius $r_9$ towards the image side, and the fifth component V is a collective component consisting of a positive lens cemented to a negative lens, the convex surface of radius $r_{10}$ of the fifth component being towards the object side, the radii $r_5$, $r_6$, $r_7$, $r_9$ and $r_{10}$, and the axial thicknesses $d_6$ and $d_8$ of the third and fourth components meeting the following requirements in terms of the equivalent focal length $f$ of the total objective array:

$$0.30\ f > r_5 > 0.17\ f,$$
$$0.30\ f > |r_6| > 0.17\ f,$$
$$0.43\ f > |r_7| > 0.28\ f,$$
$$0.53\ f > |r_9| > 0.36\ f,$$
$$10\ f > r_{10} > 1.3\ f,$$
$$0.07\ f > d_6 > 0.03\ f,\ \text{and}$$
$$0.20\ f > d_8 > 0.10\ f,$$

and the refractive index of each the first and fourth component and of the positive lens of the fifth component lies between 1.65 and 1.80.

3. A high aperture, wide angle photographic objective highly corrected for astigmatism, curvature of field, coma and distortion, of which the magnitudes are as follows:

[$f=1$    F:1.8    $2\alpha=63°$]

| Lens Component | Radius | Axial Thickness and Separation | Refractive Index | Abbe Number |
|---|---|---|---|---|
| I | $r_1=+0.6024$ | $d_1=0.1000$ | $n_1=1.7197$ | $v_1=50.2$ |
|   | $r_2=+1.398$ | $d_2=0.0028$ | | |
|   | $r_3=+0.3943$ | | | |
| II | $r_4=+4.792$ | $d_3=0.1361$ | $n_2=1.6620$ | $v_2=57.7$ |
|   | $r_5=+0.2439$ | $d_4=0.0250$ | $n_3=1.6206$ | $v_3=38.0$ |
|   | $r_6=-0.2562$ | $d_5=0.2444$ | | |
| III | $r_7=-0.3443$ | $d_6=0.0428$ | $n_4=1.7850$ | $v_4=25.9$ |
|   | $r_8=-1.516$ | $d_7=0.0028$ | | |
| IV | $r_9=-0.4267$ | $d_8=0.1472$ | $n_5=1.7197$ | $v_5=50.2$ |
|   | $r_{10}=+1.944$ | $d_9=0.0028$ | | |
| V | $r_{11}=-2.903$ | $d_{10}=0.0889$ | $n_6=1.6910$ | $v_6=54.1$ |
|   | $r_{12}=+5.855$ | $d_{11}=0.0333$ | $n_7=1.7850$ | $v_7=25.9$ | where $r_{\text{subscript}}$ is the radius of curvature of the refractive surface, $d_{\text{subscript}}$ the axial distance of the lens thickness respectively spacing, $n_{\text{subscript}}$ the index of refraction on the $d$-line, and $v_{\text{subscript}}$ the Abbe number, with all subscripts increasing in magnitude in the direction from the object to the image side of the objective for successive occurrences thereof.

References Cited in the file of this patent
UNITED STATES PATENTS

| | | |
|---|---|---|
| 2,389,016 | Wynne | Nov. 13, 1945 |
| 2,720,139 | Tronnier | Oct. 11, 1955 |
| 2,733,636 | Tronnier | Feb. 7, 1956 |
| 2,735,339 | Doi | Feb. 21, 1956 |

FOREIGN PATENTS

| | | |
|---|---|---|
| 796,086 | France | Jan. 17, 1936 |